US 11,873,239 B2

United States Patent
Kim

(10) Patent No.: US 11,873,239 B2
(45) Date of Patent: Jan. 16, 2024

(54) NANO BUBBLE AND HYDROXYL RADICAL GENERATOR (NBHRG) AND PROCESSING SYSTEM TO DECONTAMINATE WATER WITHOUT CHEMICALS USING NBHRG

(71) Applicant: NABAS Group, Inc., Rockville, MD (US)

(72) Inventor: Dong Sik Kim, Inchon (KR)

(73) Assignee: NABAS GROUP, INC., Rockville, MD (US)

(*) Notice: Subject to any disclaimer, the term of this patent is extended or adjusted under 35 U.S.C. 154(b) by 774 days.

(21) Appl. No.: 14/890,103

(22) PCT Filed: May 12, 2015

(86) PCT No.: PCT/KR2015/004764
§ 371 (c)(1),
(2) Date: Jan. 17, 2018

(87) PCT Pub. No.: WO2016/163583
PCT Pub. Date: Oct. 13, 2016

(65) Prior Publication Data
US 2018/0141837 A1 May 24, 2018

Related U.S. Application Data

(60) filed as application No. PCT/KR2015/004764 on May 12, 2015.
(Continued)

(30) Foreign Application Priority Data

Apr. 6, 2015 (KR) .................. 10-2015-0048615

(51) Int. Cl.
*C02F 1/78* (2023.01)
*C02F 1/74* (2023.01)
(Continued)

(52) U.S. Cl.
CPC .............. *C02F 1/78* (2013.01); *B01F 23/23* (2022.01); *B01F 23/233* (2022.01);
(Continued)

(58) Field of Classification Search
CPC .... B01F 3/04; B01F 3/04099; B01F 3/04503; B01F 3/04531; B01F 5/0415; B01F 5/102;
(Continued)

(56) References Cited

FOREIGN PATENT DOCUMENTS

| GB | 2514202 A | 11/2014 |
|---|---|---|
| KR | 101270696 B1 * | 6/2013 |
| KR | 10-1367695 | 2/2014 |

OTHER PUBLICATIONS

Machine translation of KR 10-1270696 to Kim, ( published Jun. 3, 2013) (obtained from KIPO Oct. 2019) (Year: 2013).*
(Continued)

*Primary Examiner* — Krishnan S Menon
(74) *Attorney, Agent, or Firm* — Quarles & Brady LLP

(57) ABSTRACT

This invention is about Nano Bubble and Hydroxyl Radical Generator and has the following detail features;
Air inlet part;
Inlet pipe for inflowing liquid connected to the above air inlet part;
Pump connected to the above inlet pipe;
Drive motor connected to the above pump;
Rotating blade connected to drive axis of the above drive motor;
Fixed blade connected to inside wall of the above pump, and arranged between the above rotating blade;
The above rotating blade, the fixed blade or cylindrical blade surfaces of both blades are slanted in a direction.
Therefore, this invention proposes Nano Bubble and Hydroxyl Radical Generator which increases dissolving rate
(Continued)

of gas by accelerating finization and mix of air and liquid through inducing turbulence of air and liquid by way of constructing slant on surfaces of each blade.

20 Claims, 11 Drawing Sheets

Related U.S. Application Data

(60) Provisional application No. 62/247,319.

(51) Int. Cl.
| | | |
|---|---|---|
| *B01F 23/23* | (2022.01) | |
| *B01F 23/233* | (2022.01) | |
| *B01F 23/232* | (2022.01) | |
| *B01F 25/51* | (2022.01) | |
| *B01F 25/52* | (2022.01) | |
| *B01F 25/53* | (2022.01) | |
| *B01F 25/312* | (2022.01) | |
| *B01F 27/272* | (2022.01) | |
| *B01F 33/81* | (2022.01) | |
| *B01F 23/2373* | (2022.01) | |
| *C02F 7/00* | (2006.01) | |
| *B01F 23/237* | (2022.01) | |

(52) U.S. Cl.
CPC ...... *B01F 23/2323* (2022.01); *B01F 23/2373* (2022.01); *B01F 25/3121* (2022.01); *B01F 25/51* (2022.01); *B01F 25/52* (2022.01); *B01F 25/53* (2022.01); *B01F 27/2721* (2022.01); *B01F 27/2722* (2022.01); *B01F 33/811* (2022.01); *C02F 1/74* (2013.01); *C02F 7/00* (2013.01); *B01F 23/237611* (2022.01); *B01F 23/237612* (2022.01); *B01F 23/237613* (2022.01); *C02F 2201/002* (2013.01); *C02F 2201/782* (2013.01); *C02F 2305/023* (2013.01); *Y02W 10/37* (2015.05)

(58) Field of Classification Search
CPC ...... B01F 5/104; B01F 5/106; B01F 7/00808; B01F 7/00816; B01F 13/1016; B01F 2003/04858; B01F 2003/04872; B01F 2003/04879; B01F 2003/04886; C02F 1/72; C02F 1/76; C02F 1/78; C02F 7/00; C02F 2201/002; C02F 2201/782; C02F 2305/023; Y02W 10/37
See application file for complete search history.

(56) References Cited

OTHER PUBLICATIONS

English Abstract, KR10-1367695, Pub Feb. 27, 2014.
EPC Communication, dated Sep. 21, 2018, in corresponding European Patent Application No. 15888568.1.

* cited by examiner

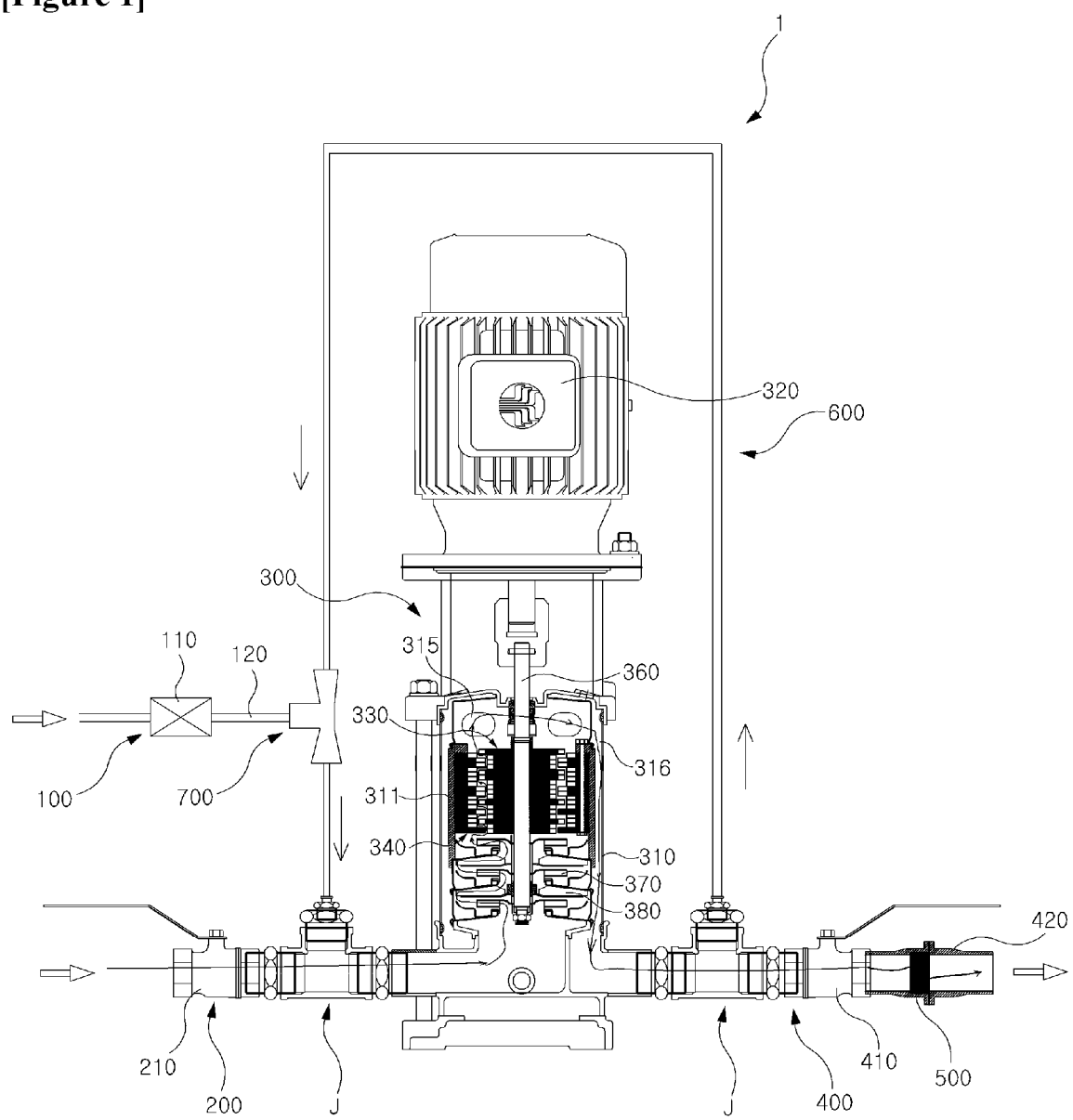
[Figure 1]

[Figure 2]
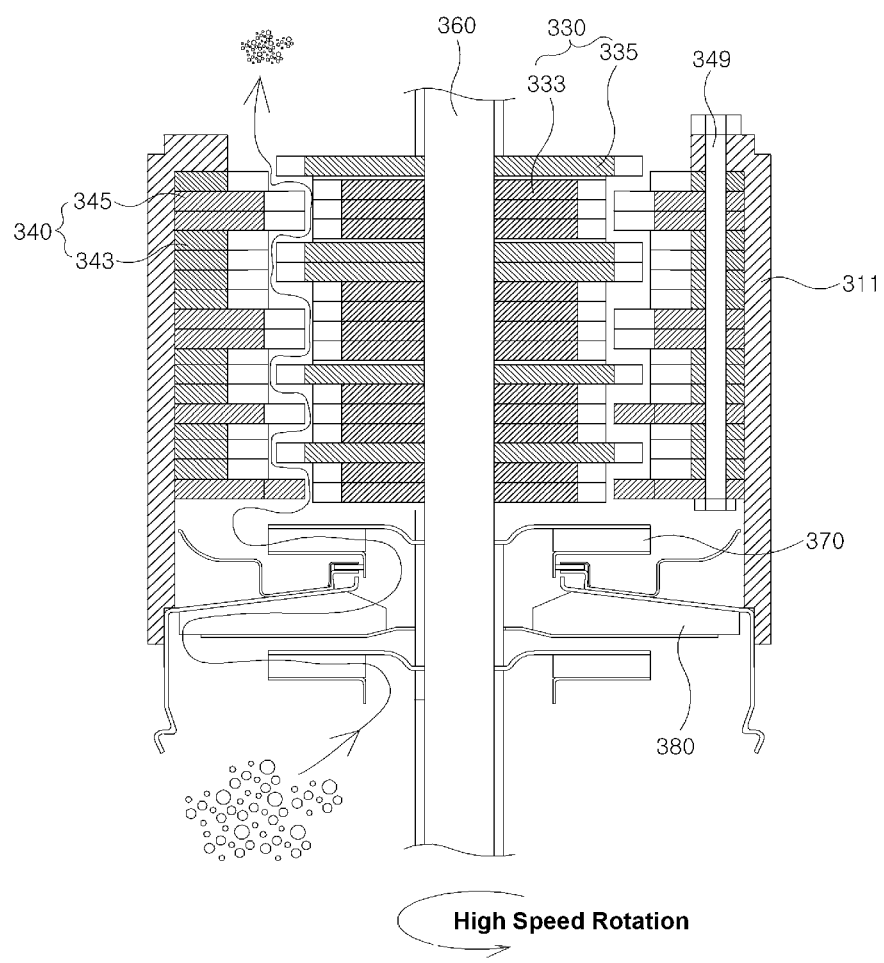

[Figure 3]
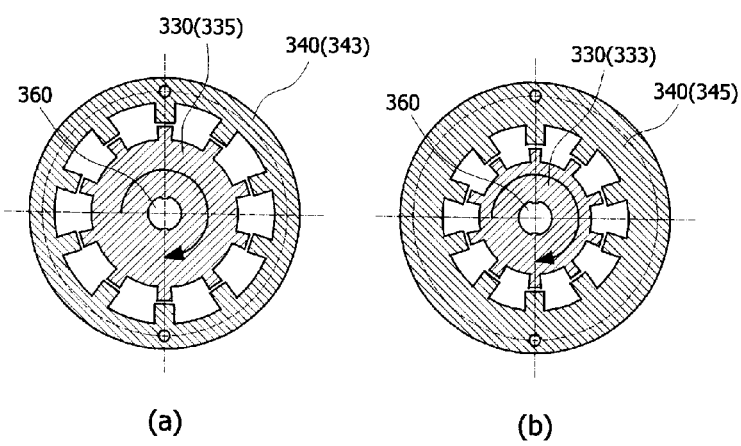

[Figure 4a]
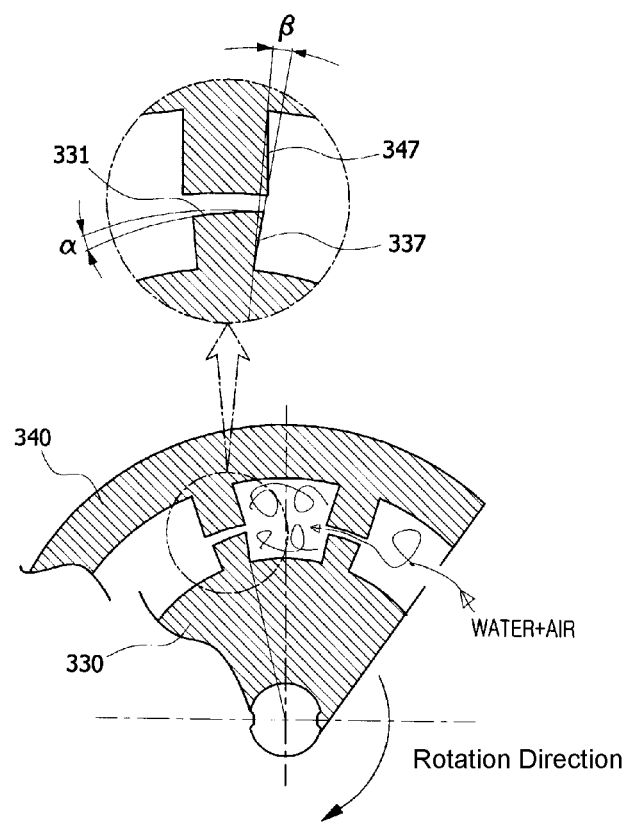

[Figure 4b]
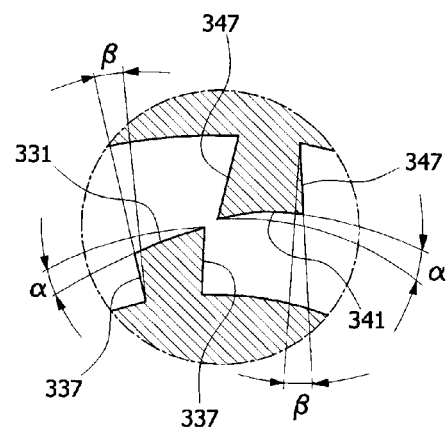
[Figure 5]
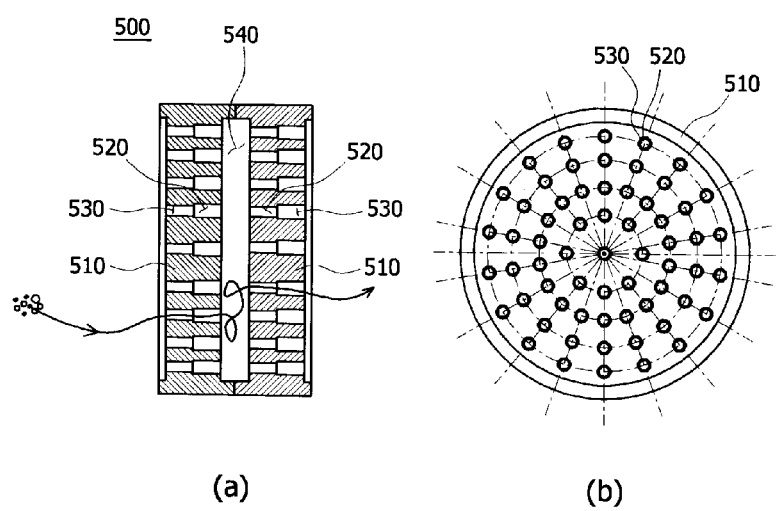
(a)  (b)

[Figure 6]
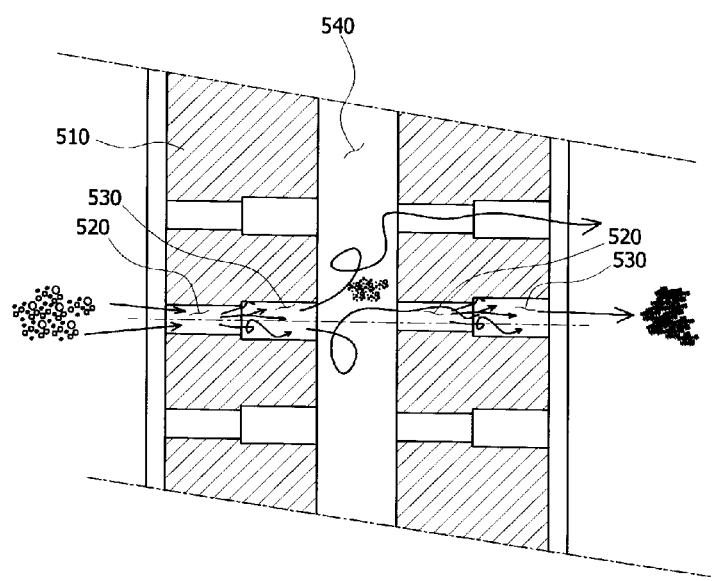

[Figure 7]
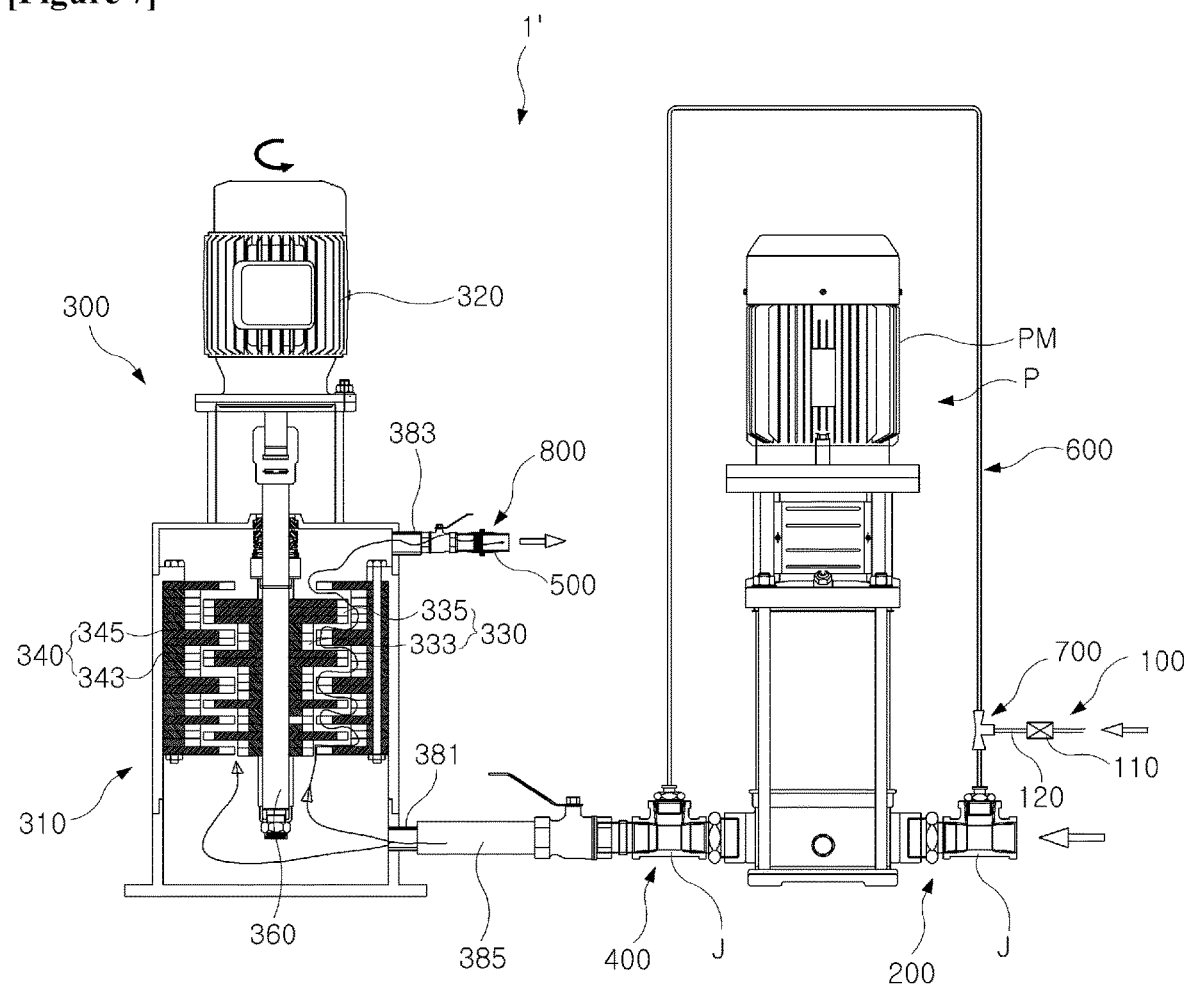

[Figure 8]
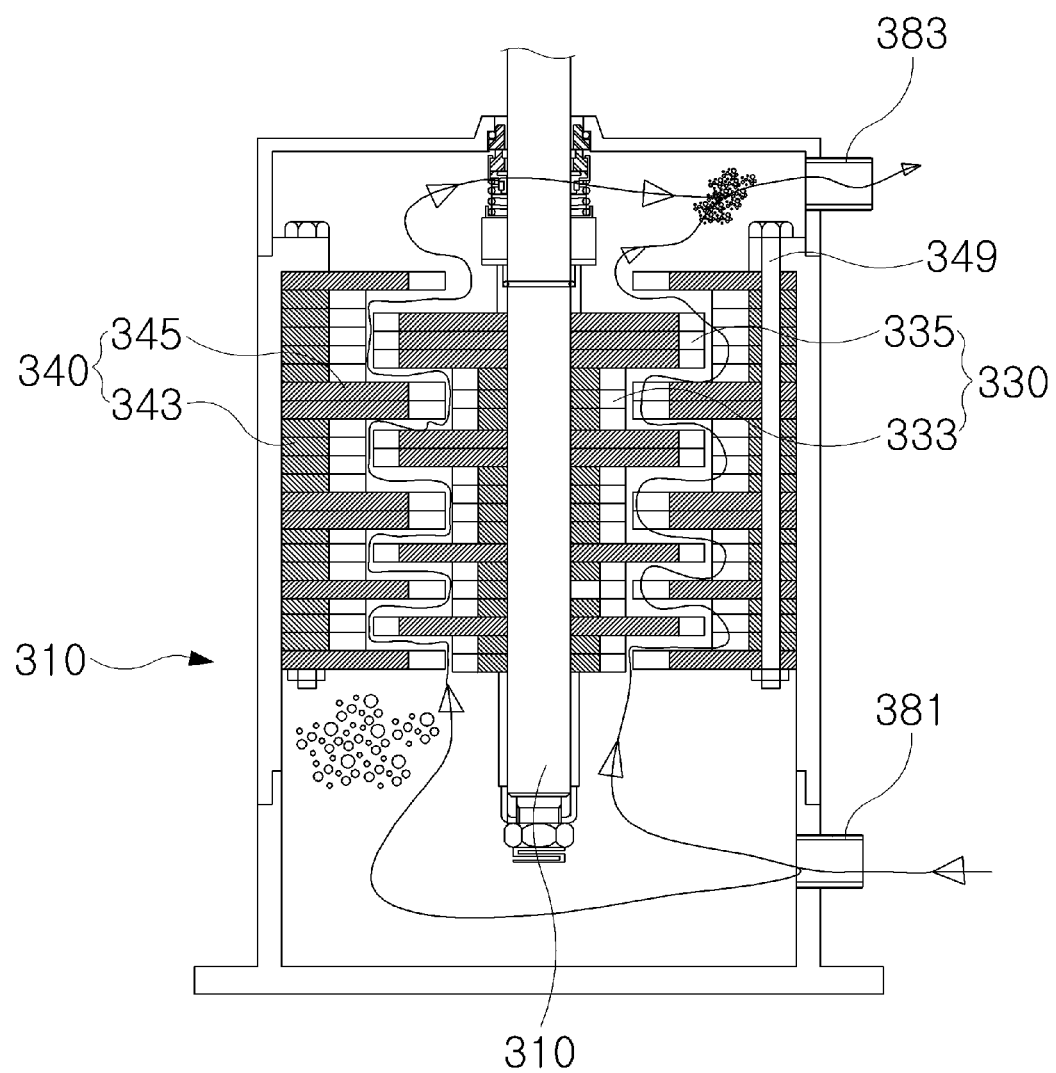

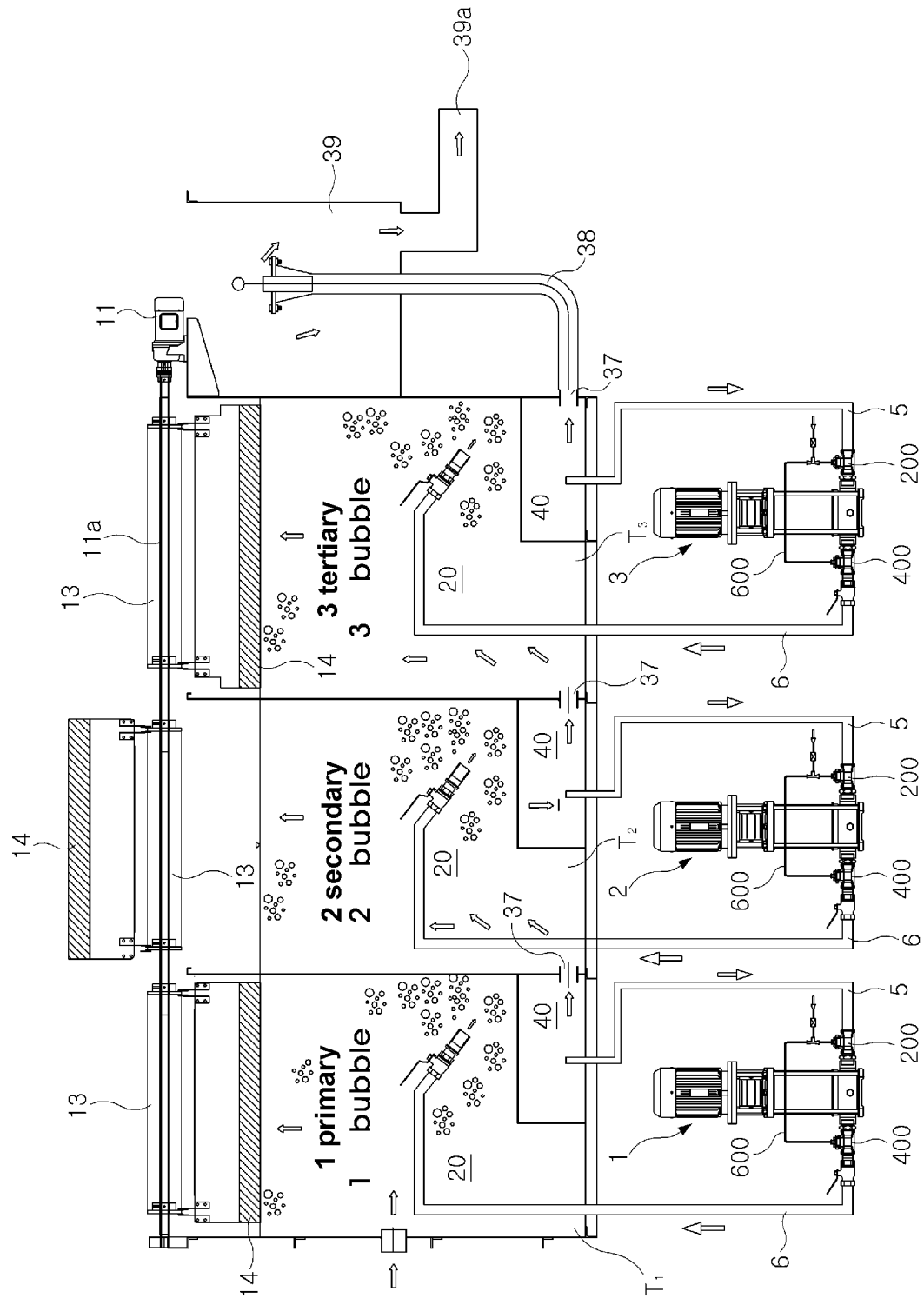

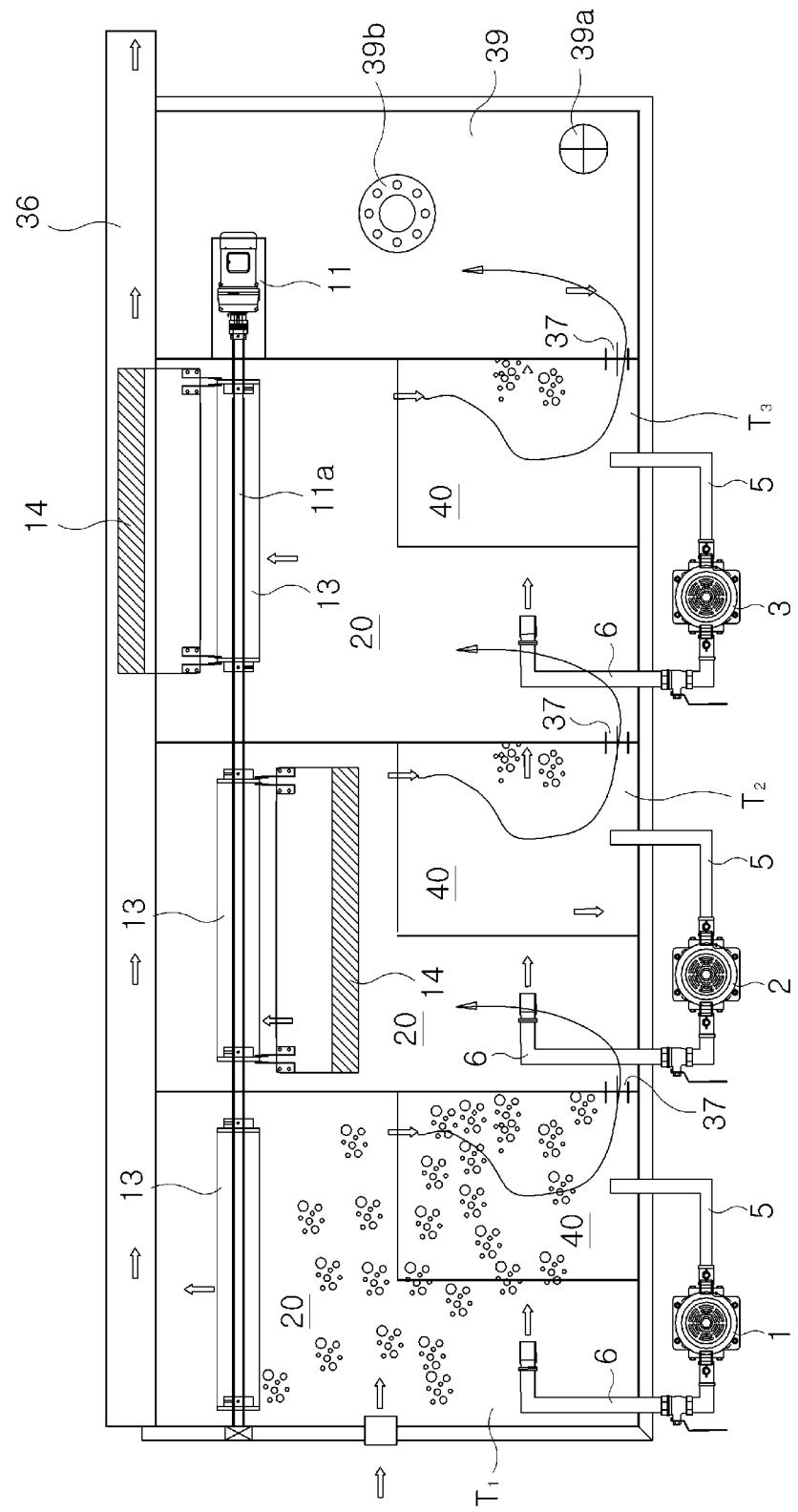
[Figure 9b]

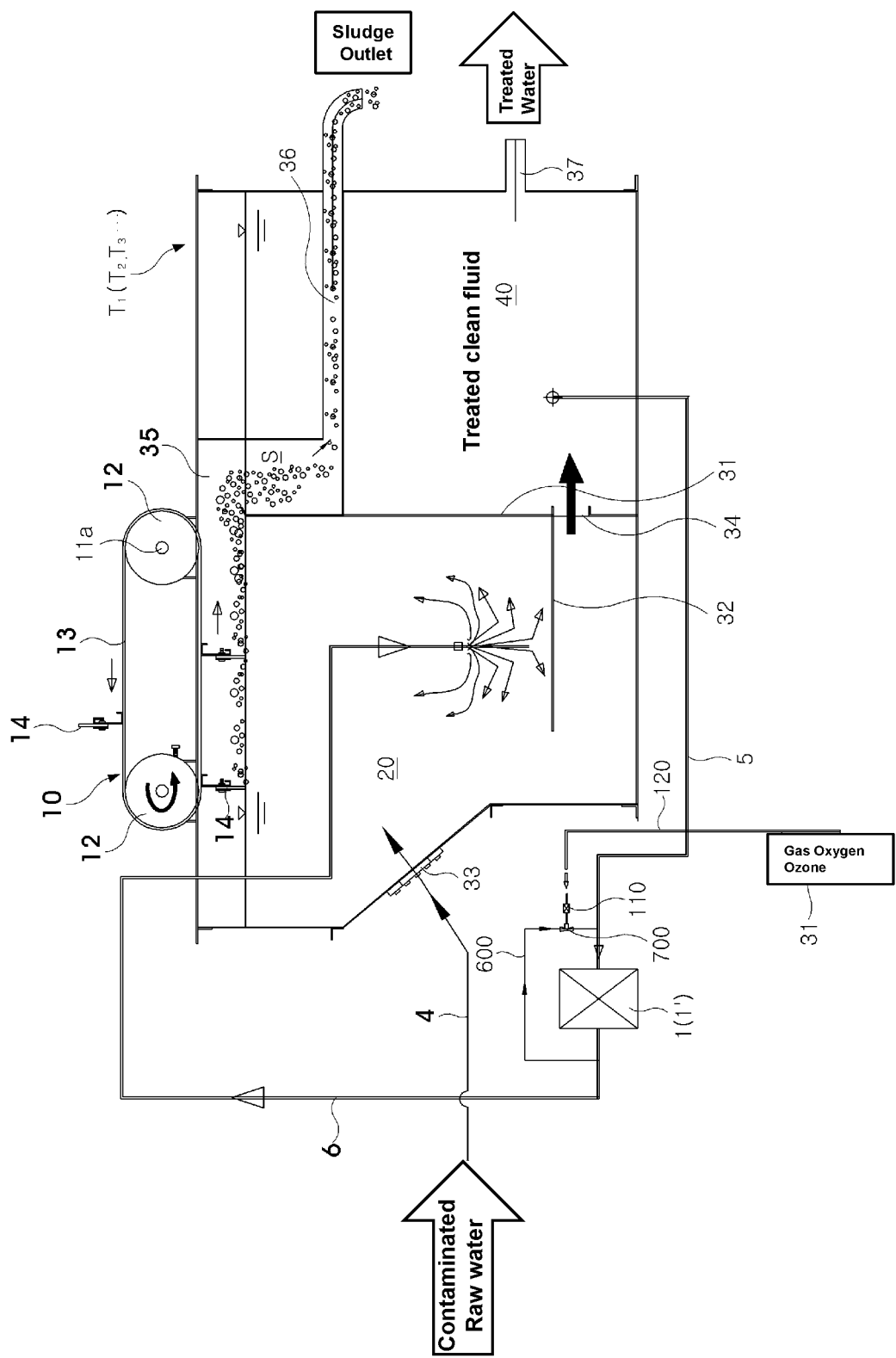
[Figure 10]

NANO BUBBLE AND HYDROXYL RADICAL GENERATOR (NBHRG) AND PROCESSING SYSTEM TO DECONTAMINATE WATER WITHOUT CHEMICALS USING NBHRG

CROSS REFERENCE TO RELATED APPLICATIONS

This application is the US National Stage application of PCT application PCT/KR2015/004764 filed May 12, 2015, and further claims priority from U.S. provisional application 62/247,319 filed Oct. 28, 2015, which are both hereby incorporated herein by reference.

TECHNICAL FIELD

This invention is about the nano-bubble-and-hydroxyl-radical generator that can generate nano bubbles and hydroxyl radical by refining and mixing air and fluid and increase the dissolved rate of the air or ozone in the fluid and system for processing polluted water without chemicals using same.

BACKGROUND OF THE INVENTION

Generally, algae or aquatic plants living in wetlands or ponds such as hazards in golf courses proliferate depending on the sunlight, water and mineral nutrients such as nitrogen or phosphorus dissolved in the water. Mineral nutrients is provided containing in the rain or irrigation water flowing into ponds.

However, the aforementioned mineral nutrients flow in continuously, algae or aquatic plants proliferate excessively and worsens eutrophication, accordingly causing a red tide phenomenon.

If a red tide phenomenon is not handled, the dissolved rate is lowered and it cases withering of algae, etc. The aforementioned withered algae, etc. are decomposed by aerobic microbes.

If the water stands still because it cannot flow, the oxygen in the water starts to be decomposed by aerobic microbes, therefore it becomes more insufficient. If it reaches the anaerobic environment that there is no or lack of oxygen, anaerobes generates hydrogen sulfide or methane and it causes a stench of ponds.

The water quality of wetlands or rivers is generally improved using the method of increasing metabolism of aerobic microbes by increasing the amount of oxygen dissolved in the water by raising the water by installing an acid radical pipe in the deep part using an air blower is mainly used.

However, the method using an air blower has disadvantages such as poor utilization of an acid radical pipe and unsmooth supply of dissolved oxygen. Therefore, it is true, that its effect of improving water quality is not good compared to equipment invested.

In particular, it is not suitable as a solution because increased algae in the summer contaminate throughout wetlands and cause a stench.

Furthermore, wetlands or water hazards in golf courses are used as an obstacle along with landscaping in the field. These lakes are decomposed quickly because its ground is finished with concrete or waterproof to prevent reduction of the flow rate or flowing backward to the field as reserved water leaks into the underground.

In addition, because agricultural pesticides are frequently used excessively to manage the grass of the field or green, the residual agricultural pesticides leak into lakes and worsen the water quality more.

For this, the method of preventing contamination of lakes usually by installing a fountain in lakes or using special enzymes was applied in the past. However, installing a fountain simply circulates the water so it was not effective in purifying the contaminated water, Using special enzymes was effective to remove pollutants however it occasions great expenses.

The Korean publication of unexamined patent applications No. 10-2007-0062060 (Jun. 15, 2007) is the traditional method to solve above problems. This patent connects a planting pocket that submerged plants can grow and a net that contains charcoals so as to compose it as an integrated type.

However, this composition cannot purify the entire water in hazards in a golf course. It works only in a limited range.

Also, a lot of planting pockets should be put to purify or improve the water of the entire hazards, therefore it was difficult to equip and maintain it. Furthermore, a planting pocket should be replaced or exchanged regularly or it should be maintained periodically, therefore it was difficult to maintain and the maintenance expenses increase.

And, the dissolved air flotation solid-liquid separation system in current terminal disposal plants of sewage separates solid-liquid by installing a pump providing water, an air-compressor inserting air, and a pressure tank, to generate nova-size micro bubbles in the raw water.

However, this system has disadvantages that it needs a lot of pump power and it requires many facilities including an air compressor and a pressure tank. Therefore, it needs a large area and it costs a lot.

DETAILED DESCRIPTION OF THE INVENTION

Object

This invention is developed to solve aforementioned problems. It is to accelerate refining and mixing of air and fluid by leading a turbulence phenomenon of air and fluid by forming an incline on the cylindrical surface of each blade in a pump and to provide the nano-bubble-and-hydroxyl-radical generator that can increase the dissolved rate.

This invention is to accelerate a turbulence phenomenon of air and fluid by introducing the vortex acceleration part that a side of a rotating blade and a fixed blade are inclined.

This invention is to extend the length of a flow path by rationalizing the layout structure of a rotating blade and a fixed blade and to more efficiently generate nano-bubble-and-hydroxyl-radical by controlling the hit flow rate by each blade.

This invention is to maximize the cavitation effect through pressure change of discharged fluids by introducing a partition on the outflow pipe of a pump.

This invention is to treat contaminated water with low cost and at the same time to prevent the secondary contamination by coagulant polymers by composing the non-chemical treatment system of contaminated water using the nano-bubble-and-hydroxyl-radical generator which has a huge economic effect by reducing the power of a pressure floatation tank of terminal disposal plants of sewage and decrease the number of facilities and the installation area, from the above-stated features.

Means for Solving Problems

The nano-bubble-and-hydroxyl-radical generator by this invention is composed of a pump that a fluid can flow in and flow out; a driving motor connected to one side of the above pump; a rotating blade installed on the rotation axis of the above driving motor and composed of a layer structure of several blades classified into large diameter and small diameter; a fixture blade installed on the inner wall side of the above pump, insertion-combined putting a certain distance in response to large diameters and small diameters of the above rotating blade, and composed of a layer structure of several blades classified into large diameter and small diameter; several impellers installed on the rotation axis of the above driving motor and placed on the entrance of the pump in front of the above rotating blade and fixed blade; several chambers placed between each impeller so that fluids carried by the rotation of the above impellers pass; an air supply part supplying at least one of air, oxygen or ozone as an inflow part of the above pump; and a recirculation pipe composed to recirculate fluids discharged to the above outflow side back to the inflow side by connecting the inflow side and the outflow side of the above pump. The air supply part is connected to the above recirculation pipe. The connected part of the above air supply pipe and recirculation pipe is composed of a venturi pipe which is composed of the bottleneck part and pipe expanding part.

The rotating blade of the nano-bubble-and-hydroxyl-radical generator by this invention features inclusion of more No. 1 inclinations that a cylindrical surface inclination of each blade is formed toward the direction opposite to the rotation direction of the rotation blade.

The fixed blade of the nano-bubble-and-hydroxyl-radical generator by this invention features inclusion of more No. 2 inclinations that a cylindrical surface inclination of each blade is formed toward the direction opposite to the No. 1 inclination of the rotation blade.

The rotating blade, fixed blade or both blades of the nano-bubble-and-hydroxyl-radical generator by this invention features formation of the vortex acceleration part which is formed to be inclined toward the radius line.

The rotating blade by this invention is composed of several No. 1 small diameters layer-built arranged on the rotation axis of the driving motor and several No. 1 large diameters arranged between No. 1 small diameters.

The fixed blade by this invention is composed of several No. 2 small diameters layer-built arranged by being fixed on the inner wall side of the pump and responding to No. 1 large diameter of the rotating blade and No. 2 large diameter arranged between No. 2 small diameters and responding to No. 1 small diameter of the rotating blade.

Each large diameter which is placed between each small diameter of the rotating blade and fixed blade by this invention is layer-built in single or multi layers but the number of layers increases on the exit of a fluid, rather than the entrance.

It is featured that more partitions are equipped on the outflow pipe to expedite generation of nano bubbles by leading pressure change of discharged fluids.

The diaphragm by this invention is connected to a wall equipped on the above outflow pipe, several small diameter parts formed on the wall and the small diameter part. It is composed of including the expanded large diameter part.

The diaphragm by this invention is composed of multiple diaphragms. As they are separated from each other, a cavitation space is formed between diaphragms.

In accordance with this invention, the non-chemical treatment system of contaminated water using the nano-bubble-and-hydroxyl-radical generator composed as described above is provided. In this system, one or more tanks with a fixed width and length are connected or arranged in a row. The above tank is divided by a diaphragm and runoff for movement or discharge of treated water inside of the tank is formed on each diaphragm. The above tank is divided into the influent water treatment chamber and the treated water storage. The treated water transfer pipe and the treated water return pipe connected with the outflow side and inflow side of the above pump are inserted to the above influent water treatment chamber and the treated water storage, respectively. The supply pipe is connected to the influent water treatment chamber of the front line tank through the raw water inlet to supply contaminated raw water. The above influent water treatment chamber and treated water storage are composed in a way that treated water flows from the above treatment chamber to the storage through a through-hole on the wall dividing these two, it is composed that at least some of fluids in the above treated water storage is supplied to the above influent water treatment chamber passing through the above nano-bubble-and-hydroxyl-radical generator. In the above influent water treatment chamber, a cutoff valve that nano bubbles collide is equipped at the certain location between the above through-hole and the end of the treated water transfer pipe. On the upper side of the above influent water treatment chamber, conveyor means with multiple transfer plates filtering out sludge and impurities in contaminated raw water or influent water are equipped.

Effects of the Invention

The nano-bubble-and-hydroxyl-radical generator by this invention can improve the dissolved rate more by accelerating refining and mixing of air and fluid by leading a turbulence phenomenon by forming an inclination on the cylindrical surface of each blade in the pump.

This invention can maximize the dissolved rate and generate hydroxyl radical by more accelerating a turbulence phenomenon of air and fluid by introducing the vertex accelerating part which is formed is a way that a side of the rotating blade and the fixed blade is inclined.

This invention can enhance credibility of the device by generating nano bubbles more effectively by extending the length of a flow path by controlling the hit flow rate by each blade by rationalizing the arrangement structure of the rotating blade and the fixed blade.

This invention introduces a diaphragm to the outflow pipe and leads pressure change of discharged fluids passing the diaphragm. For this, the diaphragm equips the small caliber and the expanded large caliber connected to the small caliber to a wall. The cavitation can be maximized as discharged fluids pass the diaphragm, the cavitation space and the diaphragm successively by forming the cavitation space as multiple diaphragms are separated from each other.

This invention can generate more perfect nano bubbles by introducing a recirculation pipe to lead fluids discharged to the outflow pipe back to the inflow pipe.

This invention can reduce electricity consumption by inhaling air from the air supply part without power using pressure change of recirculating fluids passing the venturi pipe by equipping the venturi pipe in the recirculation pipe and connecting the air supply part to the venturi pipe. This invention can also improve economic feasibility as it doesn't require an additional facility to forcibly inhale air.

This invention can reduce the pump power of the bubble generator of the pressure flotation tank of the terminal disposal plant of sewage by 50% and decrease the number of facilities and the installation area as it does not require the compressor for air injection and pressure tank facilities. In this way, it can enhance economic feasibility significantly.

BRIEF DESCRIPTION OF THE DRAWINGS

FIG. 1 is the cross-sectional drawing illustrating implementation example 1 of the nano-bubble-and-hydroxyl-radical generator by this invention.

FIG. 2 is the cross-sectional drawing showing by expanding the flow of fluids happening around and inside the pump among compositions of Drawing 1.

FIG. 3 is the cross-sectional drawing from the different position showing the combination status between the rotating blade and the fixed blade composing the pump in Drawing 2.

FIG. 4 is the cross-sectional drawing composing the angle of an edge of each blade composing FIG. 3 into different form.

FIG. 5 is the drawing illustrating the sectional structure of the diaphragm located on the outflow pipe among compositions of FIG. 1 as (a) a longitudinal sectional drawing and (b) a cross-sectional drawing.

FIG. 6 is the drawing illustrating the flow of fluids passing the diaphragm in accordance with FIG. 5.

FIG. 7 is the drawing illustrating implementation example 2 of the nano-bubble-and-hydroxyl-radical generator by this invention.

FIG. 8 is the drawing showing by expanding the flow of fluids happening around and inside the pump among compositions of FIG. 7.

FIG. 9 is the drawing illustrating (a) a front view and (b) a plane view of the non-chemical treatment system of contaminated water by this invention separating solid liquids without a compressor for air injection and a pressure tank of the pressure flotation tank system of the terminal disposal plant of sewage using the nova bubble and hydroxyl radical generator of FIG. 1.

FIG. 10 is the sketch illustrating the composition of each tank, especially tank 1 of the non-chemical treatment system of contaminated water of FIG. 9 which doesn't have a compressor for air injection and pressure tank facilities of the existing solid-liquid separation system of the terminal disposal plant of sewage.

FORMS OF THE INVENTION

Hereinafter, the nano-bubble-and-hydroxyl-radical generator by this invention will be described more in detail by referring to attached drawings.

The nano-bubble-and-hydroxyl-radical generator by this invention can be provided for the purpose to improve the water quality by increasing the dissolved rate by generating nano bubbles and hydroxyl radical refining and mixing gasses such as air, oxygen and ozone in fluid selectively and supplying to wetlands, hazards or other reservoirs in golf courses, sewage treatment plants, fish tanks or fish farms. The nano-bubble-and-hydroxyl-radical generator can be used for sanitation and cleansing of foods, deodorization, cleaning system, skin care, etc. For reference, OH radical is an oxygen anionic substance generated in a plasma status, it is also called hydroxyl radical, it is a radical ion of OH–. It has powerful oxidizing power, excellent in sanitation, disinfection, deodorization and decomposition. However, it is harmless to human body as it resolves into oxygen and water after reacting to pollutants. It has the sanitation speed 2,000 times faster than ozone and 180 times faster than ultra-violet of the sun, And it has a function of deodorizing and decomposing by reacting to almost every pollutant in air and water.

FIG. 1 and FIG. 6 illustrate implementation example 1 of the nano-bubble-and-hydroxyl-radical generator by this invention. Basically, the nano-bubble-and-hydroxyl-radical generator (1) is provided as a composition including multiple impellers (370), the pump (300) that blades (330, 340) are embedded, the driving motor (320), the inflow pipe (200) connected to the inflow part of the pipe (300) to supply fluids consisting of various sewages or circulated fluids such as treated water, the outflow pipe (400) connected to the outflow part of part of the pump (300) in response to the above inflow pipe, the air supply part (100) prepared on the inflow part of the above pump (300) to supply the air from outside or gasses extracted from the air including ozone, oxygen, hydrogen, nitrogen, etc. and the recirculation pipe (600) to recirculate fluids discharged from the above outflow pipe toward the inflow part of the pump (300) by connecting the above inflow pipe (200) and the outflow pump (400).

The air supply part (100) can be also connected to the inflow pipe, but it can be also composed to selectively mix the outside air in fluids including sewages or treated water or gasses such as oxygen or ozone supplied through the above inflow pipe (200) by connecting one side of the recirculation pipe (600) entering the inflow pipe (200) as illustrated in FIG. 1.

For this, even though not illustrated in the drawing, the air supply part (100) can selectively include an oxygen generator generating oxygen from the outside air, an ozone generator generating ozone by combining the outside air with oxygen generated by the above oxygen generator, or a certain air supply device to supply gasses such as other hydrogens or nitrogen by selecting respectively. The air supply part can be also equipped with a flow rate controller at the middle of the air supply pipe so that gasses such as air, oxygen or ozone can be supplied by the appropriate flow rate when those enter the recirculation pipe (600) or the inflow pipe (200) through the air supply pipe (100).

The recirculation pipe (600) is to realize more perfect mixing and refining of fluids through the two processes recirculating fluids mixed and refined primarily in the pump (300) back to the inside of the pump (300). For this, the recirculation pipe (600) is connected to each joint (J) of the inflow pipe (200) and the outflow pipe (400) of the pump and recirculates at least some of fluids discharged to the outflow pipe (400) by returning to the inflow pipe (200).

On the other hand, the part that the air supply pipe (20) and the recirculation pipe (600) meet is connected to the venturi pipe (700) in the form of the three way valve, Gasses such as air, oxygen or ozone supplied through the air supply pipe are mixed with discharged fluids transported through the recirculation pipe (600) while passing the bottleneck spot of the venturi pipe (700). At this time, discharged fluids naturally absorb gasses transported through the air supply pipe (120) as its pressure drops suddenly and the flow rate increases greatly while passing the bottleneck spot of the venturi pipe (700).

When introducing the venturi pipe (700) like this, air or gasses such as oxygen and ozone flowing through the air supply pipe (12) can be smoothly absorbed and mixed into fluid due to sudden change of pressure and flow rate of discharged fluids by the Bernoulli's principle, There is advantages of improvement of economic feasibility such as significant reduction of electricity consumption as it does not require an additional power source. Furthermore, recirculation of discharged fluids through the recirculation pipe (600) can be controlled to implement more than once as necessary and reliability of the device can be more strengthened as more complete nano bubbles can be generated through this.

As stated, the inflow pipe (200) and the outflow pipe (400) of the pump are connected with the recirculation pipe (600) centering on the joint, respectively. The open and shut valves (210)(410) can be equipped in the inflow pipe (200) and the outflow pipe (400) so as to control the flow rate of supplied or discharged fluids and open and shut the flow path.

The nano-bubble-and-hydroxyl-radical generator (1) by this invention generates nano bubbles by making cavitation by hitting sewages or treated water and gasses such as air, oxygen or ozone supplied through the inflow pipe (200) with multiple blades (330, 340). For this, multiple impellers (370) rotating with the drive oldie motor axis (360), the fixed blade (340) fixed on the inner wall of the pump housing (310) and the rotating blade (340) rotating-driving along the above motor axis (360) and leading the relative rotation of the above fixed blade (340) are equipped to the inside of the pump (300). Advisably, the impellers (370) are located on the position close to the inflow part of the pump (300) and the rotating blade (330) and the fixed blade (340) are placed on the upper position behind the impellers (370) apart from the impellers (370) and the rotating blade are provided by a combining as all-in-one, type on the motor axis (360). Also, it is advisable that one or more chambers that water (contaminated or treated) and outside air or gasses such as oxygen and ozone transported by rotation of the impellers (370) pass should be arranged between each impeller (370) inside the pump (300).

In this multilevel pump structure, the impellers (370) and the chambers (380) are arranged repetitively in turn. The impellers (370) rotate by driving of the motor axis (360), By its rotation power, fluids that water and air, oxygen or ozone are mixed are pumped on the inflow part of the pump (300) and sent to the blade (330, 340), located at the upper side of the impellers (370). Also, as fluids that water and air, oxygen or ozone are mixed pass through multiple impellers (370) and multiple chambers (380) connecting these impellers in this process, the dissolved rate of the above gasses in the water sent to the blades (330, 340) generate nano bubbles by interaction of the rotating blade (330) and the fixed blade (340) by driving of the motor axis (360), namely respective rotation, and are also discharged to the outflow side of the pump from the discharge exit (315) at the upper side of the pump housing (310), through the flow path (316).

Not described mark '349,' illustrated in FIG. 2 exemplarily, is a fastening bolt. This fastens a fixed blade (340) to the inner wall (311) of the pump housing (310). The rotating blade (330) and the fixed blade (340) are the form that each blade is layered-combined as a multilayer structure of certain thickness. On the encountering surface of the facing rotating blade (330) and fixed blade (340), multiple small calibers (333)(343) and multiple large calibers (335)(345) projected at a certain length between these small calibers (335 (345) are formed. Here, it is advisable that the tip of each large caliber (335)(345) and small caliber (333)(343) is shaped as a sharp edge (see FIG. 3). Furthermore, each large caliber of the rotating blade (330) and the fixed blade (340) can be placed with one large caliber at the bottom which is the entrance that fluids inflow and with multiple large calibers as a layered form at the top that fluids flow out.

This makes mixing of water and gasses more smooth and enables generation of more refined nano bubbles by generating nano bubbles primarily, despite the small amount, by hitting fluids with one large caliber blade as mixed fluids that nano bubbles are not generated yet are flowed in at the bottom, the inflow part of fluids and by secondarily hitting fluids that the primary nano bubbles are formed with the large caliber of the multiple layered blade at the top, the outflow part of fluids.

Furthermore, it is advisable to make the insert depth between large calibers (335)(345) of the rotation blade (330) and the fixed blade (340) by this invention 0.5 times longer than the blade length, as illustrated in FIG. 2, This can obtain the effect of extending the length of the flow path by enabling large calibers (335)(345) of each blade to be inserted as deep as possible, And by this, as a connecting area of each blade and fluids widens, it can hit more amounts of mixed fluids and make more smooth mixing and refining of water and gasses.

Also, this form of the rotating blade (330) and the fixed blade (340) can be arranged as a form that large calibers (335)(345) are inserted by being crossed with each other. It is advisable that a flow gap of a certain width that mixed fluids sent from the impellers (370) is formed between each large caliber (335)(345) and small caliber (343)(333) countering with each other in this status (see FIG. 2 or FIG. 4).

More in detail, the large calibers (335) of the rotating blade are in intervened in a status that they are inserted between the large calibers of the above fixed blade at a certain distance, namely the aforementioned flow gap. Also, on the contrary, the large calibers (345) of the fixed blade (340) are intervened in a status that they are inserted between the large calibers (345) of the above rotating blade (330) at a certain distance, namely the aforementioned flow gap.

When the motor (330) drives from this structure, the rotating blade (330) combined on the motor axis (360) is rotating together, And from this, as the small caliber (333) and the large caliber (335) rotate between the large caliber (345) and the small caliber (343) of the fixed blade (340) respectively, the respective rotation occurs between the large calibers (335)(345) and the small calibers (343)(333) of the rotating blade (330) and the fixed blade (340).

At this time, the mixed fluids flowed into the flow gap between the rotating blade (330) and the fixed blade (340) are more refined and mixed as it is split to pieces by respective rotation occurred between the large calibers (335) (345) and small calibers (343)(333). At this time, if the rotating blade (330) is rotated over certain high speed, the mixed fluids are refined and mixed to nano size under 5 micron. Therefore, the dissolved rate in the fluids can be more increased.

Especially, for the nano-bubble-and-hydroxyl-radical generator by this invention, it is advisable for the cylindrical surface of each blade of the rotating blade (330) and/or the fixed blade (340) to be formed to incline toward the same direction for smooth generation of nano-sized micro bubbles (hereinafter, 'nano bubble') (see FIG. 4). For this, the rotating blade (330) that the inclination ($\alpha$) of the cylindrical surface of each blade is formed toward the direction opposing to the rotation direction of the rotation blade (330). In detail, supposing that the rotation direction of the rotating blade (330) is inclination 1 (331) is a clockwise rotation, the inclination is higher at the rotation direction and lower at the opposite direction (see FIG. 4a). In response to this, it can be selectively composed as inclination 2 (341), which the inclination of the cylindrical surface of each blade of the fixed blade (340) is formed toward the direction opposing to inclination 1 (331) of the above rotating blade (330), namely the direction opposing to the rotation direction of the rotating blade (330). In this case, inclination 2 (341) can be formed in a way that the direction opposing to inclination 1 (331) is lower and the opposite part is higher (see FIG. 4b).

Therefore, when the rotating blade (330) rotates, inclination 1 (331) encounters first at top dead center of each inclination as approaching inclination 2 (341). As rotation continues, a space between cylindrical surfaces formed as each blade faces each other. This process forms a sudden vortex in mixed fluids and the cavitation is maximized.

On the other hand, an angle of inclination 1 (331) and inclination 2 (341) can be determined considering the length and width of the cylindrical surface of each blade and the flow rate or flow speed of inflow mixed fluids. An angle of each inclination can be manufactured identically or with different angles according to the described factors.

Referring to (a) drawing of FIG. 4, the rotating blade (330) and the fixed blade (340) can compose the vortex accelerating part to accelerate generation of vortex in mixed fluids by inclining one side of the blade to a certain angle (β) against the radius line.

For this vortex accelerating part (337)(34), the side of each blade is projected obliquely toward a direction opposite to the flowing direction of inflow mixed fluids. Therefore, turbulence of the mixed fluids encountering with it is accelerated. Due to occurrence of a cavitation phenomenon caused by this, generation of nano bubbles can be accelerated.

In this case, it is advisable that angles of the vortex accelerating part (337)(347) formed in each blade of the rotating blade (330) and the fixed blade (#40) are manufactured identically. However, a set angle can be determined variously considering various factors including the size and length of e eh blade and the conduct of the mixed fluids, without being limited to the above recommendation.

In the drawing, it is illustrated that the vortex accelerating part is formed on either of the rotation blade (330) or the fixed blade (340). However, it can be formed on both the rotating blade (330) and the fixed blade (340), Also, as illustrated in (b) drawing of FIG. 4, the vortex accelerating part can be formed on both sides of each blade of the rotating blade (330) and the fixed blade (340).

In accordance with FIG. 1, the discharge exit (315) is formed at least at one part of the top of the pump (300) so that the mixed fluids containing nano bubbles generated by interaction of the rotating blade (330) and the fixed blade (340) inside the pump (300) can be discharged. The flow path that is formed along the height direction of the pump is provided so that fluids escaping the above discharge exit (315) can flow toward the outflow side of the pump (300) between the pump housing (310) and its inner wall (311). The fluids descended through this flow path is discharged to the outside through the outflow pipe (400) as a status containing nano bubbles.

On the other hand, for the outflow pipe (400) located on the outflow side of the pump, the dissolved rate in fluids can be increased more if fluids discharged through this can be refined and mixed one more time by changing pressure. For this, this implementation example provides the composition arranging a diaphragm (500) inside the outflow pipe (400) as illustrated in FIG. 1. According to FIGS. 5 and 6, the diaphragm is composed of many walls (510) arranged at the top and the bottom side b side toward the flow path in the above outflow pipe (400). At this point, as the discharged fluids are more refined by pressure change while passing the large caliber (530) after escaping the small caliber (520) a cavitation phenomenon can be accelerated.

In addition to that, it is advisable for the diaphragm (520) to arrange a certain size of a space between consecutive forms of the small caliber (500) and the large caliber (530). The discharged fluids passing this can refine and mix the discharged fluids more as a cavitation phenomenon is more accelerated along with sudden reduction of pressure. In this case, it is advisable to determine the number of continuity and repetition of the small caliber (520) and the large caliber (530) of the diaphragm so that the discharge pressure of fluids can be maintained approximately at 4 $kg/m^2$ Only, the discharge pressure and the design dimension of the diaphragm (500) described above can be determined by considering various factors such as the output or the flow rate of the driving motor (320) and reflecting these factors to the design process.

FIG. 7 or FIG. 8 is implementation example 2 of the nano-bubble-and-hydroxyl-radical generator by this invention. Basically, it shows the form that adds a pressure pump (P) to supply certain pressure fluids to the nano-bubble-and-hydroxyl-radical generator. In here, the composition that connects a pressure pump (P) to the inflow side of the nano-bubble-and-hydroxyl-radical generator is provided. In the nano-bubble-and-hydroxyl-radical generator (1'), the rotating blade (330) and the fixed blade (340) are equipped inside the pump (300) as shown in FIG. 1. In the pressure pump, the impellers and chambers (not illustrated) are equipped as illustrated in FIG. 1. The nano-bubble-and-hydroxyl-radical generator is connected to the outflow pipe (400) of the pressure pump (P) by the medium of a joint. The joint can be equipped with the open and shut valve to control or open and shut the supplied fluids.

The impeller (not illustrated) that is mounted on the pump motor (PM) and the driving axis of this pump motor (PM) can be included in the pressure pump (P). The recirculation pipe (600) to recirculate pressure fluids from the outflow pipe (400) to the inflow pipe (200) of the pressure pump (P) can be connected by the medium of the joint. In this case, the air supply pipe (120) of the air supply part (100) can be connected to the recirculation pipe (600) as shown in FIG. 1. As the venturi pipe (700) is connected to the part that the air supply pipe (120) and the recirculation pipe (600) meet, the effect stated above can be provided.

From this composition, fluids pressured from the pressure pump (P) through the connection pipe (385) flows in at the entrance formed at the bottom of the pump (300). Gasses in the water is finely ground and mixed by pressure hit by each blade and discharged through the exit (383) arranged at the top of the pump. In this case, the discharge pipe (800) is connected to the exit (383) and this discharge pipe (800) also controls or opens and shuts the flow rate of discharged fluids as the open and shut valve is mounted. Furthermore, the diaphragm (500) of the composition described above can be amounted to the discharge pipe (800) and through this, the secondary cavitation can be accelerated as mentioned above.

Next, the non-chemical treatment system of contaminated water to treat various sewages from lakes, streams, homes or factories on the ground without using chemicals using the nano-bubble-and-hydroxyl-radical generator by this invention will be described.

FIG. 9 or FIG. 10 illustrates by example the non-chemical treatment system of contaminated water by this invention that separates solid-liquid without a compressor for air injection or a pressure tank of the pressure floatation system of the terminal disposal plant of sewage using the nano-bubble-and-hydroxyl-radical generator of FIG. 1 (or the nano-bubble-and-hydroxyl-radical generator of FIG. 7), FIG. 9 is (a) the front view and (b) the plane figure of the non-chemical treatment system of contaminated water by this invention. FIG. 10 is a sketch illustrating by example each tank of the non-chemical treatment system of contaminated water in FIG. 9, especially tank 1 not equipped with a compressor for air injection and pressure tank facilities of the solid-liquid separation system of the existing terminal disposal plant of sewage. In accordance with FIG. 9a and FIG. 9b, the non-chemical treatment system of contaminated water has a form that multiple tanks (T1, T2, T3) stand In a row. Each tank has a certain width and length and is connected to each other toward the width or length direction.

As an example, each tank (T1, T2, T3) is divided by walls formed in one tank at a certain distance. Therefore, it can be provided as a form of being connected to the width direction as illustrated in FIG. 9, it is composed in a way that water treated in each tank moves to the next tank as a runoff (37) is formed on walls dividing tanks.

Looking at the detailed form of each tank by referring to FIG. 10, tanks (T1, T2, T3) are divided into the inflow water treatment chamber (20) and the treated water storage (40). The treated water transport pipe (6) and the treated water return pipe (5) connected to the outflow pipe (400) and inflow pipe (200) of the nano-bubble and-hydroxyl-radical generator (1) are inserted, respectively, to the inflow water treatment chamber (20) and the treated water storage (40) in each tank. At the end of the treatment transport pipe (6) inserted to the inflow water treatment chamber (20) of each tank, a spray nozzle that high-pressure spray of nano bubbles and pressure fluids is available can be equipped.

Furthermore, for tank 1 (T1), the water supply pipe (4) can be connected through the raw water inlet (33) to supply contaminated raw water as illustrated in FIG. 10. Tank 1 or tank 3 (T1, T2, T3) is connected through a runoff (37) formed on the dividing wall between these. The inflow water treatment chamber (20) and the treated water storage (40) of each tank are connected through the through-hole (34) formed on the wall (31) dividing these. The through-hole (34) connecting the inflow water treatment chamber (20) and the treated water storage (40) should be formed at the bottom of the dividing wall (31) if circumstances allow. In the inflow water treatment chamber (20) of each tank, a certain cutoff valve (32) can be equipped at a certain position between the end tips of the above through-hole (34) and the treated water transport pipe (6). This cutoff valve is to prevent contaminated water or inflow water that is not treated by high pressure nano bubbles provided by the nano-bubble-and-hydroxyl-radical generating device (1) from moving to the next tank without being treated. The spray nozzle at the end of the treated water transport pipe (6) should be located at the top of the cutoff valve (32).

The sludge removal mean (10) to filter out sludge or foreign substances included in the contaminated raw water or inflow water is equipped at the top of the inflow water treatment chamber (20) of each tank (T1, T2, T3). This sludge removal mean (10) has a structure that multiple transport plates (14) are installed on the surface of the conveyor belt or chain (13). Conveyor belts (13) consisting each sludge removal mean (10) is driven by rotating the sprocket (12) by driving shafts (11a) which cross the top of each tank and are extended from the motor (11). Through this, the transport plates (14) of the surface of the belt filter out sludge or foreign substances floating on the top of the contaminated raw water or inflow water in the inflow water treatment chamber (20) and discharge through the sludge discharge passages (35, 36) located on the top rear side of the inflow water treatment chamber (20).

Describing the operation of the non-chemical treatment system of contaminated water by this invention by referring to FIG. 9 or FIG. 10 in this composition, after contaminated water is flowed into the tank 1 (T1) through the water supply pipe (4), the nano-bubble-and-hydroxyl-radical generator 1 (1) generates nano bubbles by drawing purified water (treated water) from the treated water storage (40) through the treated water return pipe (5). Then, it supplies generated nano bubbles into the inflow water treatment chamber (20) of tank 1 (T1) through the treated water transport pipe (6), Nano bubbles discharged into the inflow water treatment chamber (20) of tank 1 (T1) crash into the cutoff valve (32) and then float on the top of the treatment chamber. At this time, sludge or foreign substances contained in the contaminated raw water float to the top with nano bubbles, Sludge or foreign substances floating to the top of the inflow water treatment chamber (20) are filtered out to the back by the transport plate (14) as the removal mean is driven. The sludge or foreign substances filtered out accordingly are discharged to outside through the sludge discharge passages (35, 36) located at the top rear side of the inflow water treatment chamber (20).

On the other hand, the treated water transported to the treated water storage (40) through the through-hole (34) formed on the dividing wall (31) after removing sludge, etc. in the inflow water treatment chamber (20) of tank 1 (T1) moves to the inflow water treatment chamber (20) of tank 2 (T2) again through the runoff (37). Some of it is supplied to the nano-bubble-and-hydroxyl-radical generator 1 (1) through the treated water return pipe (5) as stated above.

The treated water of tank 1 (T1) flowed into the inflow water treatment chamber (20) of tank 2 (T2) moves to the treated water storage (40) through the through-hole formed on the dividing wall (31) after additional sludge or foreign substances float, to the top of the treatment chamber (20) by the nano-bubble-and-hydroxyl-radical generator 2 (2) and are filtered out by the sludge removal mean, with the same method as the tank 1. The treated water in the treated water storage (40) generates nano bubbles as some of it is supplied to the nano-bubble-and-hydroxyl-radical generator 2 (2) again through the treated water return pipe (5) at the same time it moves the inflow water treatment chamber (20) of tank 3 (T3) through the runoff (37).

The treated water of tank 2 (T2) flowed into the inflow water treatment chamber (20) of tank 3 (T3) moves to the treated water storage (40) through the through-hole formed on the dividing wall (31) after additional sludge or foreign substances float, to the top of the treatment chamber (20) by the nano-bubble-and-hydroxyl-radical generator 3 (3) and are filtered out by the sludge removal mean, with the same method as the tank 1. The treated water in the treated water storage (40) repeats the process of generating nano bubbles as some of it is supplied to the nano-bubble-and-hydroxyl-radical generator 3 (3) through the treated water return pipe (5) at the same time it is finally discharged to outside through the runoff (37)

Like this, in the non-chemical treatment system of contaminated water by this invention, sludge and other foreign substances of inflow raw water float to the top of the tank by nano bubbles discharged by powerful pressure from the nano-bubble-and-hydroxyl-radical generator 1 or 3. Floated foreign substances such as sludge are transported by the sludge removal mean and discharged to outside, Purified fluids by this process flow into the second and third tank and can be used finally. The treated fluids can be very helpful to restore the ecosystem as turbidity and heavy metals are decomposed by nano bubbles and hydroxyl radical of sludge and high dissolved oxygen and anions are contained.

Furthermore, the fluids treated by this invention can be recycled as it has sterilizing power. It uses the method of removing pollutants using nano bubbles and hydroxyl radical without coagulative chemical treatment like the previous method so as to prevent the secondary contamination by coagulant polymers flowing into streams, etc. Moreover, the above system composition does not require a pressure tank and a pressure compressor of the existing terminal disposal plant of sewage. Therefore, it is very cost effective as the power consumption rate is reduced by more than 50%.

The nano-bubble-and-hydroxyl-radical generator which is the invention is explained based on particular forms and directions by referring to the attached drawings. However, this invention can be modified and changed by a person skilled in the relevant field of technology. It should be interpreted that such modification and change is included in the scope of a right of this invention.

DESCRIPTION OF SIGNS

P: Pressure Pump
PM: Pump Motor joint
100: Air Supply Part
110: Flow Rate Controlling Gauge 120: Air Supply: Pipe
200: inflow Pipe 210: Open and Shut Valve
300: Pump
310: Pump Housing 311: Inner Wall
315: Discharge Exit 320: Driving Motor
330: Rotating Blade 331: Inclination 1
333: Small Caliber 1 335: Large Caliber 1
337: Vertex Accelerating Part 1 340: Fixed Blade
341: Inclination 2 343: Small Caliber 2
345: Large Caliber 2 347: Vertex Accelerating Part 2
349: Fastening Bolt
360: Motor Axis (Shaft)370: impeller
380: Chamber 381: Entrance
383: Exit 385: Connection Pipe
400: Outflow Pipe
410: Open and Shut Valve 420: Outflow Pipe
500: Diaphragm
510: Wall 520: Small Caliber Part
530: Large Caliber Part 540: Space
600: Recirculation Pipe 700: Venturi Pipe
800: Discharge Pipe

The invention claimed is:

1. A Nano Bubble and Hydroxyl Radical Generator (NBHRG), comprising:
a pump accommodating liquid flow in and flow out through a pump inlet coupled to a pump outlet;
a drive motor connected to a side of the pump;
rotating blades installed in the drive motor in a stacked configuration with blades having two or more different calibers;
fixed blades installed in an inside wall of the pump in a stacked configuration with blades having two or more different calibers;
multiple impellers installed in a rotation axis of the drive motor, and placed between a pump inlet and the rotating blades and fixed blades;
multiple chambers positioned between the multiple impellers to transport liquid through rotation of the multiple impellers;
a gas generator that supplies at least one gas to the pump inlet;
a liquid recirculation pipe that resupplies liquid flowing from the pump outlet to the pump inlet and connects the pump inlet to the pump outlet;
each rotating blade having a circumferential surface with a side portion and each fixed blade having a circumferential surface with a side portion, wherein each of the side portions of the circumferential surfaces of the rotating blades and the circumferential surfaces of the fixed blades are slanted so that each side portion has an inclination,
wherein each inclination of each side portion on each rotating blade is slanted so that an inclination is higher on a side nearer rotation direction and lower on an opposite side of the rotation direction, and
each inclination of each side portion on each fixed blade is slanted so that an inclination is lower on a side nearer the rotation direction of rotating blade and higher on an opposite side,
wherein a vortex accelerating part is provided such that each rotating blade, each fixed blade, and the blade sides of each blade are slanted against a reference radius line.

2. The Nano Bubble and Hydroxyl Radical Generator (NBHRG) of claim 1, further comprising:
an air inlet connected to the liquid recirculation pipe, wherein a connection part connects the air inlet and the liquid recirculation pipe using a venturi tube having a bottleneck part and an expansion part.

3. The Nano Bubble and Hydroxyl Radical Generator (NBHRG) of claim 1, wherein the gas generator comprises at least one of an oxygen generator or an ozone generator.

4. The Nano Bubble and Hydroxyl Radical Generator (NBHRG) of claim 1, further comprising:
a diaphragm installed at the outlet of the pump to accelerate production of the nano bubbles by inducing a pressure change in the liquid exiting the outlet;
wherein the diaphragm comprises a diaphragm structure placed in the outlet having multiple small diameter partitions at the diaphragm, and an expanded large partition that is connected to the small diameter partitions.

5. The Nano Bubble and Hydroxyl Radical Generator (NBHRG) of claim 4, further comprising multiple diaphragms separated from each other to form a space there between.

6. The Nano Bubble and Hydroxyl Radical Generator (NBHRG) of claim 3, wherein the generated nano bubbles infused with ozone or oxygen is used to treat water in a water treatment system, and further comprises:
multiple ones of water tanks connected and arranged in a linear row, wherein each water tank is divided by partitions having holes to transport and/or discharge processed water from each water tank;
wherein each of the water tanks comprises a processing compartment for inflowing water and a storage compartment for processed water; and
a transfer pipe connected to the pump outlet and a collection pipe connected to the pump inlet, wherein the processing compartment receives inflowing water with nano bubbles from the transfer pipe and the collection pipe collects processed water outflowing from the storage compartment;
the processing compartment of a front-line water tank including a pipe is connected through a water inlet to supply original contaminated water to the front-line water tank to flow from one water tank to a next water tank in the row;
wherein the processing compartment for inflowing water and the storage compartment for processed water are constructed so that processed water can flow from the processing compartment to the storage compartment through a hole in the partition that divides the two compartments;

a cutoff valve causing produced nano bubbles to collide located between the hole in the partition and the end of the transfer pipe installed in the processing compartment; and a discharge outlet at a final water tank for discharging treated water from the treatment system.

7. The Nano Bubble and Hydroxyl Radical Generator (NBHRG) of claim 6, further comprising a conveyor possessing multiple transfer plates to filter out sludge and contaminants in original contaminated water or inflowing water, which is installed at the upper portion of the processing compartment for inflowing water.

8. A method for producing nano bubbles with hydroxyl radicals, comprising the steps of:

forcing a liquid to flow in and flow out through a pump inlet coupled to a pump outlet of a liquid pump;

mixing the liquid flow with rotating blades in a stacked configuration with several blades of different caliber and fixed blades on an interior wall of the pump in a stacked configuration with several blades of different caliber;

rotating multiple impellers installed in a rotation axis of a drive motor of the pump, said impellers placed between a pump inlet and the rotating blades and fixed blades;

transporting liquid through multiple chambers between the multiple impellers through the pump and propelled by rotation of the multiple impellers;

supplying at least one gas from a gas generator to the pump inlet to introduce to the liquid flow under pressure;

resupplying liquid flowing from the pump outlet to the pump inlet with a liquid recirculation pipe connecting the pump inlet to the pump outlet;

each rotating blade having a circumferential surface with a side portion and each fixed blade having a circumferential surface with a side portion, wherein each of the side portions of the circumferential surfaces of the rotating blades and the circumferential surfaces of the fixed blades are slanted so that each side portion has an inclination, wherein each inclination of each side portion on each rotating blade is slanted so that an inclination is higher on a side nearer rotation direction and lower on an opposite side of the rotation direction, and each inclination of each side portion on each fixed blade is slanted so that the inclination is relatively lower on a side nearer the rotation direction of rotating blade and higher on an opposite side, wherein a vortex accelerating part is provided such that one or more of each rotating blade, each fixed blade, and the blade sides of each blade are slanted against a reference radius line.

9. The method for producing nano bubbles with hydroxyl radicals of claim 8, further comprising the steps of:

mixing the liquid under pressure so as to produce cavitation and produce nano bubbles containing ozone gas;

wherein the ozone gas in the nano bubbles reacts with the liquid to produce hydroxyl radicals.

10. The method for producing nano bubbles with hydroxyl radicals of claim 9, further comprising the step of exposing a target material to the hydroxyl radical containing liquid to thereby treat the target material by destroying or neutralizing a contaminant in the target material.

11. The method for producing nano bubbles with hydroxyl radicals of claim 10, wherein the liquid and the target material comprise water.

12. A nano bubble generating system, comprising:

a nano bubble generator comprising a set of rotating blades and a set of fixed blades, at least some of the rotating blades having different calibers relative to one or more other rotating blades and at least some of the fixed blades having different calibers relative to one or more other fixed blades, wherein the rotating blades are repeatedly rotated at high speed to propel and pressurize a liquid flowing into and through the system;

a gas generator selectively infusing generated oxygen into the liquid, or into an ozone generator, or into both the liquid and the ozone generator;

the ozone generator selectively infusing generated ozone into the liquid;

the nano bubble generator rotating the liquid under pressure around the fixed blades and the rotating blades at sufficiently high enough speed to cause internal pressure cavitation and create, in the liquid, nano bubbles comprised of infused oxygen and/or ozone; and ejecting the nano bubble infused liquid from the nano bubble generator, and a pump propelling the rotating liquid cavitating under pressure, the cavitating caused by the rotating blades and fixed blades; and wherein at least one side of a surface of at least one of the rotating blades and the fixed blades is slanted.

13. The nano bubble generating system of claim 12, further comprising:

a pump propelling a liquid flow through a pump inlet coupled to a pump outlet;

rotating blades coupled to a drive motor and arranged in a stacked configuration with blades having different calibers;

fixed blades installed along an inner wall of the pump and arranged in a stacked configuration with blades having different calibers at a certain distance corresponding to the rotating blades;

multiple impellers installed in a rotation axis to propel liquid through the pump, and placed between a pump inlet and the rotating blades and the fixed blades; and multiple chambers positioned between the multiple impellers to transport liquid through the pump, the liquid propelled by the multiple impellers to pass into and out of the multiple chambers.

14. The nano bubble generating system of claim 12, wherein the slant of cylindrical surface of each of the rotating blades is comprised of a first slanted part in which its surface is slanted against rotation direction of the rotating blade so that it is higher in rotation direction and lower on an opposite side of rotation direction, and the slant of cylindrical surface of each of the fixed blades is comprised of a second slanted part in which its surface is slanted against the slant direction of the cylindrical surface of each of the rotating blades so that it is relatively lower on the opposite side of the surface of the first slanted part and higher on its other side, wherein a vortex accelerating part is formed such that the rotating blade, the fixed blade, and the blade sides of both blades are slanted against a reference radius line.

15. The nano bubble generating system of claim 13, further comprising:

a diaphragm installed at the pump outlet to enhance production of the nano bubbles by inducing a pressure change in the liquid exiting the pump outlet;

wherein the diaphragm comprises a diaphragm structure placed in the pump outlet having multiple small diameter partitions at the diaphragm, and an expanded large partition that is connected to the small diameter partitions.

16. The nano bubble generating system of claim 15, further comprising multiple diaphragms separated from each other to form a space there between.

17. The nano bubble generating system of claim 12, wherein the nano bubbles produced contain ozone gas, wherein the ozone gas undergoes a chemical reaction with the liquid to produce hydroxyl radicals.

18. The nano bubble generating system of claim 17, wherein the liquid comprises water.

19. The nano bubble generating system of claim 17, wherein the generated nano bubbles and hydroxyl radicals are used to treat water in a water treatment system, and further comprises:

multiple ones of water tanks connected and arranged in a linear row, wherein each water tank is divided by partitions having have holes to transport and/or discharge processed water from each water tank;

wherein each of the water tanks comprises a processing compartment for inflowing water and a storage compartment for processed water, wherein water flows from the processing compartment to the storage compartment; and a transfer pipe connected to the pump outlet and a collection pipe connected to the pump inlet, wherein the processing compartment receives inflowing water with nano bubbles from the transfer pipe and the collection pipe collects processed water outflowing from the storage compartment;

the processing compartment of a front-line water tank including a pipe is connected through a water inlet to supply original contaminated water to the front-line water tank to flow from the water tank to a next water tank in the row;

wherein the processing compartment for inflowing water and the storage compartment for processed water are constructed so that processed water can flow from the processing compartment to the storage compartment through a hole in the partition that divides the two compartments;

a valve causing produced nano bubbles to collide and which is located between the hole in the partition and the end of the transfer pipe installed in the processing compartment; and a discharge outlet at a final water tank for discharging treated water from the treatment system.

20. The nano bubble generating system of claim 19, further comprising a conveyor possessing multiple transfer plates to filter out sludge and contaminants in original contaminated water or inflowing water, which is installed at the upper portion of the processing compartment for inflowing water.

* * * * *

UNITED STATES PATENT AND TRADEMARK OFFICE
CERTIFICATE OF CORRECTION

PATENT NO. : 11,873,239 B2
APPLICATION NO. : 14/890103
DATED : January 16, 2024
INVENTOR(S) : Dong Sik Kim Page 1 of 1

It is certified that error appears in the above-identified patent and that said Letters Patent is hereby corrected as shown below:

In the Specification

Column 2, Line 27, "nova" should be --nano--.

Column 5, Line 37, "nova" should be --nano--.

Column 6, Line 48, "(20)" should be --(120)--.

Column 7, Line 16, "oldie" should be --of the--.

Column 8, Line 22, "FIG. 4." should be --FIG. 4).--.

Column 9, Line 20, "(34)" should be --(347)--.

Column 9, Line 32, "of e eh blade" should be --of each blade--.

Column 9, Line 61, "side b side" should be --side by side--.

Signed and Sealed this
Fifteenth Day of July, 2025

Coke Morgan Stewart
*Acting Director of the United States Patent and Trademark Office*